Sept. 23, 1958    H. G. LIEN    2,852,935
TIRE TESTING APPARATUS
Filed Jan. 17, 1955    2 Sheets-Sheet 1
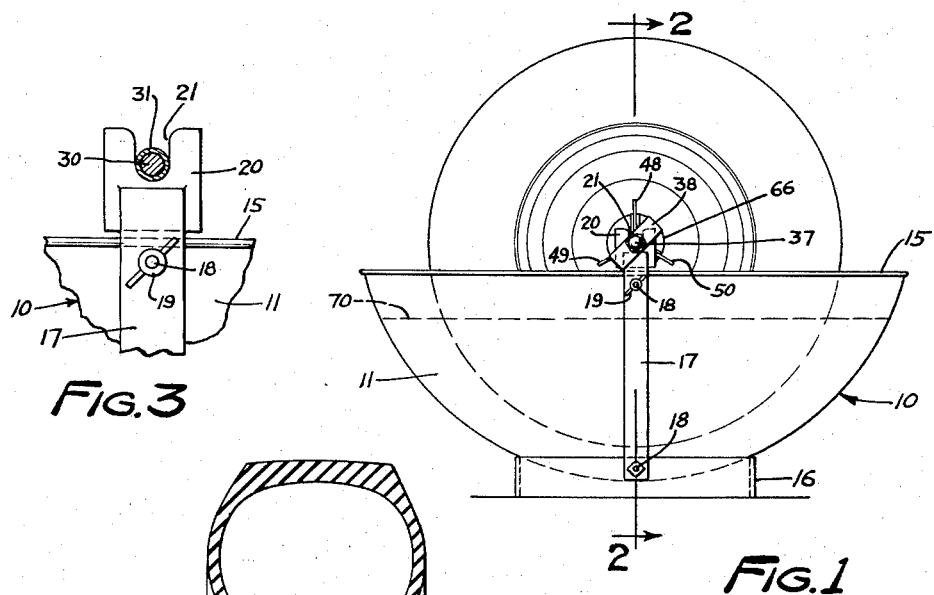
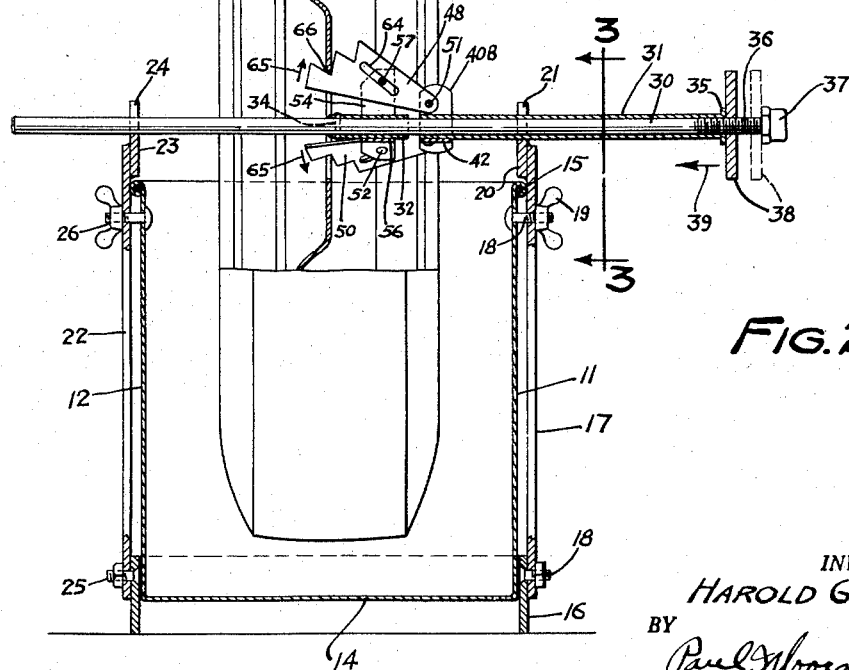
INVENTOR.
HAROLD G. LIEN
BY
ATTORNEYS

United States Patent Office

2,852,935
Patented Sept. 23, 1958

2,852,935

TIRE TESTING APPARATUS

Harold G. Lien, Minneapolis, Minn., assignor to Bishman Manufacturing Co., Osseo, Minn., a corporation of Minnesota Application January 17, 1955, Serial No. 482,267

12 Claims. (Cl. 73—45.6)

This invention relates to testing devices for automotive tires. Recently there has come to be used in the automotive industry a pneumatic tire known as the "tubeless" tire. This tire has a casing made of impermeable construction so as to be able to retain air under high pressure. The casing is mounted upon a wheel, the rim of which is likewise of impermeable construction, and is fitted with a valved inlet or "stem" for the introduction of air under pressure into the tire. The casing has the usual beaded shoulders which press against suitably shaped flanges on the tire rim. The entire assembly of rim and casing, when mounted together, thus forms a tight enclosure into which the air of the tire is introduced. In the usual automotive construction the rim is provided with a permanently attached wheel which is constructed so as to be demountable from the axle flange of the automobile wheel.

This relatively recent "tube-less tire" development in automotive tire and wheel construction has made it difficult to provide adequate testing facilities for testing the tire-wheel arrangement for air leakages of the tire-rim assembly.

It is an object of the present invention to provide a handy and sturdy structure for mounting the tire-wheel assembly for testing the tire and rim assembly for air leakage. It is a further object of the invention to provide a useful tire and service station tool which may be utilized with a wide variety of tube-less tires, mounted upon varying wheel sizes, for testing any of them for air leakage. It is another object of the invention to provide a testing stand for demountable wheel-type tubeless tire assemblies; it is a further object of the invention to provide an improved tire-wheel assembly test stand capable of being utilized with a wide variety of tire wheel styles and sizes.

Other and further objects of the invention are those inherent in the apparatus herein illustrated, described and claimed.

Figure 4:
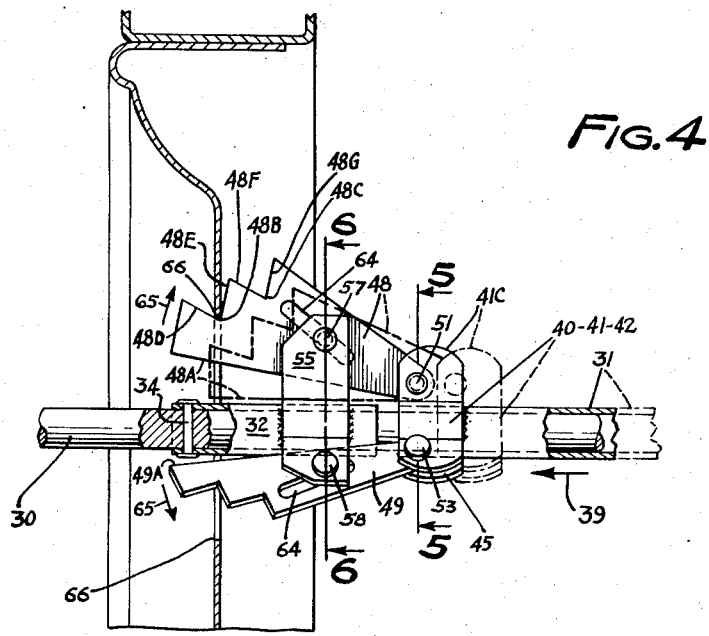
Figure 5:
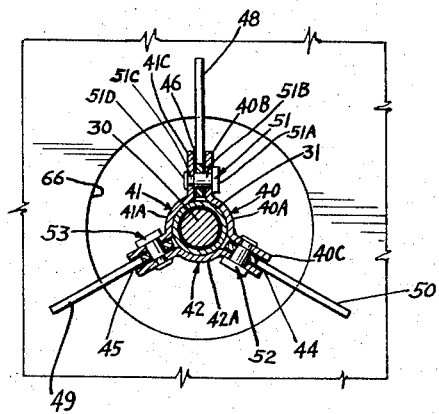
Figure 6:
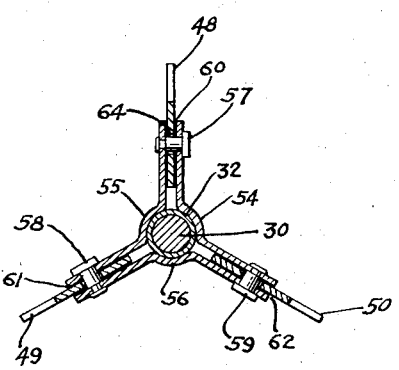

The invention is illustrated with reference to the drawings in which corresponding numerals refer to corresponding parts, and in which Figure 1 is a side elevational view of the tire testing apparatus of the present invention illustrating a tire thereon in testing position. Figure 2 is an enlarged vertical sectional view taken along the line and in the direction of arrows 2—2 of Figure 1. Figure 3 is an enlarged fragmentary front elevational view of a part of the mounting arrangement of the present invention, taken along the line and in the direction of arrows 3—3 of Figure 2. Figure 4 is a fragmentary vertical sectional view corresponding to Figure 2 but illustrating in greater detail the internal construction of the testing apparatus. Figure 5 is a fragmentary vertical sectional view taken along the line and in the direction of arrows 5—5 of Figure 4; and Figure 6 is a fragmentary vertical sectional view taken along the line and in the direction of arrows 6—6 of Figure 4.

Referring to the drawings, the testing apparatus includes a tank generally designated 10. This tank is generally composed of sheet metal and is semi-circular in shape, or slightly in a semi-circle. The tank has opposite vertical sidewalls 11—12 as shown in Figure 2, and an arcuate outer wall 14. The upper edges of the sidewalls 11 and 12 and the terminal edges of the outer wall are preferably beaded-over as illustrated in Figure 2 and are provided with an internal reinforcing rod as at 15, so as to provide a greater degree of stiffness along the upper edge of the tank structure. The tank is supported in the position shown in Figures 1 and 2 by means of a bottom frame 16 of sheet metal, and of rectangular configuration. The tank itself is attached to the frame 16 by any suitable form of attachment, not illustrated, and as shown in Figure 1 the tank is thus disposed with its upper terminal edge 15 in a horizontal plane. To the lower mounting frame 16, at the vertical center line of the front and back walls of the tank, there are attached mounting brackets. Thus at the front of the testing arrangement there is provided a mount 17, which is attached by the bolt 18 at its lower end, and is supported against lateral displacement by a bolt 18 held in place by wing nut 19 adjacent its upper end. The upper end of the mounting bar 17 is provided with a widened part 20 which has a vertically opening notch 21 in its upper surface. A similar mounting bar 22, having the widened parts 23 at the top provided with a notch 24 and held in place by the lower bolt 25 and the bolt and wing nut 26, is provided at the back wall 12. The two mounting plates 20 and 23, provided with the notches 21 and 24 which are aligned, thus provide a bearing into which the testing mounting with the wheel-rim-tire assembly thereon, may be disposed, as will now be described.

The mounting for the wheel-rim-tire assembly consists of a solid rod 30 which extends well through from the front to the rear of the mounting. Upon the front portion of the rod 30 there is disposed a tube 31 which is slideable with reference to the mounting. At about the middle part of the rod 30 there is provided a short length of tube 32 which is held in place by a rivet 34 or welded by any other suitable mode of attachment. The front end of the tube 31 is flanged out as at 35 and the front end of the rod 30 is provided with threads as at 36. At the very front of the threaded portion 36 of the rod there is provided a decorative cap nut 37 which is pulled down tightly in place. Between the flange 35 and the inner face of the nut 37 there is also provided a bar 38 which is threaded so that it turns on the threaded portion 36 of the rod, like a nut. The bar is long enough so that the operator can easily grasp it and turn it for screwing it forwardly or rearwardly from the dotted line position to the full line position as shown in Figure 2. When the bar 38 is turned, so as to be screwed in the direction of the arrow 39, it reaches a position in which it contacts with the flange 35 and hence the entire tube 31 is moved or slid along the rod 30.

At the rear end of the tube 31 there are provided radially extending pairs of plates, which are best shown in Figure 5. These plates, 40, 41 and 42, are identical with each other and have a central curved portion 40A, 41A and 42A which fits the exterior diameter of the tube 31. Then each of the plates is provided with a radially extending ear portion as at 40B and 40C for the plate 40, and these ear portions are spaced, so that when the three plates are assembled upon the tube 31 they will provide spaces as at 44, 45 and 46 in which the expanding vanes 48, 49 and 50 of the mounting are adapted to be positioned and moved. The plates 40, 41 and 42 are made so as to receive the rivets 51, 52 and 53. One end of the rivet is provide with a head as at 51A and the shank 51B is of a size such that it passes through the adjacent ear portion as at 40B. The terminal end of the rivet is of reduced diameter as at 51C and this passes through a somewhat smaller hole in the adjacent parallel ear portion 41C of the plate 41. The outer portion of the rivet is then riveted-over as at 51D. This arrangement maintains the spacing as at 46, and similar riveting arrangements likewise maintain the spacings as at 44 and 45. At the same time the shank of the rivet as at 51B forms a smooth pivot on which the plate 48 may move arcuately without binding. The plates 49 and 50 are likewise mounted so as to be moveable arcuately without binding.

The entire assembly of the three plates 40, 41 and 42 is fastened to the tube 31 by dimpling it to the tube or by welding or any other suitable mode of attachment so that as the tube 31 is moved in the direction of the arrow 39, Figure 2, the assembly of plates 40—41—42 will likewise be moved and will force the plates 48, 49 and 50 in the same direction.

Upon the short length of tube 32 there is a similar mounting arrangement as shown in Figure 6. Here the tube 32 is provided with plates as at 54, 55 and 56, each of the plates being shaped so as to fit the exterior diameter of a portion of the exterior surface of tube 32, the three plates being held together by the rivets or cam followers 57, 58 and 59, so as to provide the spaces 60, 61 and 62 in which the three plates 48, 49 and 50 are adapted to slide. At the places where the rivets 57, 58 and 59 pass through the plates 48, 49 and 50 respectively, there is provided an elongated slot positioned as shown in vertical elevation in Figures 2 and 4 for the plate 48. Thus the plate 48 is provided with an elongated slot as at 64 defining inner, longitudinal cam edges. The entire arrangement of plates 54, 55 and 56 is likewise firmly attached to the exterior surface of the tube 32 by dimpling or welding. It will be recalled that the tube 32 is in turn attached to the rod 30 by means of the rivet 34 and the plate assembly 54—55—56 is accordingly firmly attached with reference to the rod 30. Therefore when the tube 31, with its plate assembly upon it, is moved in the direction of the arrow 39, the three radially disposed blades 48, 49 and 50 will likewise be moved in the direction of arrow 39. However, due to the positioning of the slots 64 of plate 48 and the corersponding slots of the remaining plates, the movement of the plates in the direction of 39 will also impose upon their left ends, as shown in the drawings, a radially outward arcuate movement as indicated by the arrows 65—65, Figures 2 and 4, and this movement is utilized for gripping the inner surface of the wheel aperture at 66. Thus as shown in Figure 2 when the plates 48, 49, etc. are in a retracted position as indicated by the dotted lines in Figure 4, each of the plates is withdrawn so that its inner edge, such as edge 48A and 49A, will be substantially parallel with the exterior surface of the tube 32. Each of the plates is provided with a pair of notches at the outer left end. Thus the plate 48 is provided with a notch as at 48B and another notch at 48C. One wall of each of these notches slants upwardly and outwardly from the edge 48A. Thus the edge 48D slants to the left and radially outwardly at a slight angle from the edge 48A, whereas the other edge of the notch at 48E is at right angles to the edge 48A. Similarly the second notch at 48C has one edge, 48F, which is parallel to the edge 48D, and another edge 48G, which is at right angles to the edge 48A. All of the plates 48, 49 and 50 are similarly shaped. The two notches at 48B and 48C grip the inner edge of the hole 66 in the wheel, and the two notches are provided for gripping holes of different diameters. I have discovered by utilizing two notches, and a range of radially expansive movement, as provided by the position of the slot 64 in the plate 48 and corresponding slots in the remaining plates 49 and 50, I am able to obtain a sufficient total range of positions for the notches 48B and 48C so as to grip all commercial sizes of automotive wheel holes.

Thus when it is desired to test a tire-rim-wheel assembly for air leakage, the assembly consisting of the rod 30, the tube 31, tube 32 and the associated parts mounted thereon, is removed from the testing rack and the plate 38 is screwed back against the nut 37. When in this position the tube 31 can then be drawn back against the plate and this has the effect of retracting the vanes 48, 49 and 50 to the dotted line position shown for plate 48, as in Figure 4. In this position the notches 48B and 48C are at their respective minimum diametric radial positions. The assembly is then introduced into the hole 66 of the wheel of the tire which is to be tested and the plate 38 is then screwed in a direction away from the nut 37. This causes the tube 31 to slide upon the rod 30, and this in turn causes the plates 48, 49 and 50 to be translated along and, due to the action of the slot 64 against the rivets 57, 58 and 59, as shown in Figures 4 and 6, the plates 48, 49 and 50 will be moved in a direction forwardly as well as radially outward. The user generally positions the device so that one or the other of the notches 48B or 48C will grip the edge of the hole 66, an appropriate position being initially selected so that as the plate 38 is moved out to its limiting position, the device will firmly grip the edge 66. It will be noted that in this position the edge 48E and the edge 48D are both disposed at an angle with reference to the plane of the wheel and thus the wheel is held firmly in the notch 48B. The device accordingly centralizes itself in a plane which is perpendicular to the plane of the wheel, and corresponds to the axis of the axle on which the wheel is normally mounted. If the range of movement imposed by the plate 38 upon the tube 31 is insufficient to cause the plates 48—49—50 to grip a particular size hole 66, the plate 38 is screwed back and the next larger size of notch is selected. It is within the scope of this invention to provide more than two notches as at 48B and 48C if desired for varying sizes of devices.

After the device has thus been gripped into the edge 66 of the wheel, the entire wheel and testing device is then lifted into a position and settled into the notches 21 and 24 of the supporting stand where the wheel is then free to turn. The tank 10 is filled with water to a level such as shown by the dotted line 70 of Figure 1 and the rim-tire assembly is inflated with air under pressure and any bubbling will then indicate the location of a leak in the pneumatic system.

The action of the plate assembly 54—55—56 on the tube 32, as shown in Figure 6, holds the vanes 48, 49 and 50 from any rotary movement with reference to them and, since the vanes are attached to the plate assembly 40, 41 and 42, as shown in Figure 5, the latter is also held against turning movement, which accordingly holds the tube 31 against turning movement with reference to the rod 30. Therefore the tube 31 can only slide back and forth from moving the vanes 48, 49 and 50 as previously described.

The mounting assembly of the present invention, together with its stand, may be utilized for uses other than the pneumatic testing of the tubeless tire. Thus the assembly of rod 30, tube 31, tube 32 and the associated parts, firmly grips the wheel in a position corresponding to that in which it is mounted on the automotive vehicle, and by providing rollers at the notches 21 and 24, the device may be utilized for testing the entire wheel-rim-tire assembly for determining whether it runs in true, whether it is out of balance, etc. For such purposes the tank 10 would not be used, or, if present, would not be filled with water.

It is apparent that many modifications and variations of this invention as hereinbefore set forth may be made without departing from the spirit and scope thereof. The specific embodiments described are given by way of example only and the invention is limited only by the terms of the appended claims.

What I claim is:

1. An apparatus for temporarily test-mounting an assembly composed of a wheel having a large concentric central aperture therein, a rim on the wheel and a tubeless tire casing on the rim comprising, an open-topped tank for containing liquid to a prescribed level, said tank having bearing means on opposite wall portions thereof, said bearing means being arranged in axially spaced relations thereon, a temporary test axle of a length to reach axially across the tank and beyond the bearing means for resting in said bearing means, expansible wheel gripping means mounted centrally between the ends of and on the axle said gripping means having surfaces thereon for engaging the wheel at said large central aperture, adjustable means manually operable on the axle for moving said wheel gripping means to a position for engaging at least spaced points around the peripheral edge of said wheel at said aperture for holding the wheel concentrically at the aperture for rotation with said test axle and with the lower portion of said wheel rim and tire assembly below the prescribed liquid level of the tank.

2. The apparatus of claim 1 further characterized in that said wheel gripping means comprises a plurality of vanes movable inwardly and outwardly in respect to the axis of said axle, and said adjustable manually operable means is mounted on said axle to move said vanes from a position where they do not grip the wheel to a position where they do grip the wheel.

3. An apparatus for testing a tubeless tire and wheel-rim assembly for air leaks, comprising a supporting structure, an open-topped water tank shaped to receive for complete immersion a peripheral portion of the air-confining tubeless tire and rim, an axle structure, wheel engaging means securing the wheel and axle structure in substantially co-axial relation to each other, and axle supporting posts on the supporting structure and adjacent the upper portion of the tank, each post including an aligned notch in the upper portion thereof for receiving and supporting the axle to facilitate immersion of a peripheral portion of the assembled tire and rim, whereby the assembled tire and rim may be rotated to test the entire periphery of the tire-rim assembly for air leaks.

4. The apparatus of claim 1 further characterized in that said adjustable manually operable means includes a plurality of vanes mounted on the axle for wheel engaging expansive movement in arcuately spaced radial planes, and manual means on the axle for moving said vanes.

5. An apparatus for temporarily mounting a wheel-rim assembly having a concentric mounting hole for rotation about its axis, said apparatus comprising a tube having a rod slidably fitted therein and extending therethrough, said tube being provided with a plurality of radially disposed pivot mountings in a common transverse plane through one end thereof, a corresponding plurality of cooperating radially disposed and stationary pins mounted on the rod, in another common transverse plane, a series of radial substantially identical plates, each pivoted on one of the pivot mountings and each having a slot therein disposed out of parallel with the axis of the tube and slidable on one of the cooperating radially disposed pins mounted on the rod, means on the rod and operable against the tube for sliding the tube along the rod for thereby simultaneously pushing and pivoting the plates, each of said plates having a notch in its outer edge for gripping the edge of a central mounting hole of an automotive wheel-rim assembly for thereby centralizing said wheel and mounting and holding said assembly.

6. The apparatus of claim 5 further characterized in that the notch of each of said plates has one notch edge which slants outwardly at a low angle to the axis of the tube and a second notch edge which is substantially at right angles to the axis of the tube when the plate is in a position such that the notch is at a minimum radial distance from the axis of the tube, said plates being pivotally movable to increase the degree of angularity of each of said angles when the plate is pivotally moved to wheel gripping position.

7. The apparatus of claim 5 further characterized in that each plate is provided with more than one similar notch, said notches being similarly oriented and disposed at successively greater radial distances from the axis of the tube for gripping wheel holes of varying sizes.

8. The apparatus of claim 5 further characterized in that said means on said rod for sliding the tube along the rod comprises threads on the rod and a cooperable hand-operable nut threaded thereon capable of being turned on said threads for engaging the tube and forcibly sliding it on the rod.

9. An apparatus for pneumatically testing tubeless tires while mounted on a rim-wheel assembly comprising an upwardly opening tank having spaced front and back walls and side and bottom walls for containing water or the like, a pair of aligned upwardly opening bearing plates having notches therein, one of said plates being mounted on the front wall and one on the back wall, a mounting assembly comprising a pair of members, one of which is a tube and the other a rod neatly slidable therein, said members having a length sufficient in the aggregate to reach across from one of said bearing notches to the other for rotation when rested therein, means on one member for forcibly sliding it with reference to the other member, a plurality of radial vanes of corresponding size, shape and orientation, each having at least one notch for engaging the circumferential edge of the hole in an automotive wheel, each of said vanes having a cam edge thereon disposed at an angle to the members when the vane is at such a position that its notch is at a minimum radial distance from the axis of the members, pivotal connections between one end of each vane and one of the members and a cam follower located against the cam edge of the vane and connected to the other member for arcuately moving the radial vane when the members are forcibly moved relative to each other.

10. The apparatus of claim 9 further characterized in that said bearing plates are detachably mounted with reference to the upper edge of the back wall and front wall of the tank for removal therefrom.

11. The apparatus of claim 9 further characterized in that the rod has a length extending entirely across from the front wall to the back wall and said tube is of shorter length.

12. The apparatus of claim 9 further characterized in that the rod and tube members are each of circular cross-section.

References Cited in the file of this patent

UNITED STATES PATENTS

| | | |
|---|---|---|
| 648,676 | Young | May 1, 1900 |
| 1,181,355 | Stevens | May 2, 1916 |
| 1,628,168 | Malke | May 10, 1927 |
| 2,203,688 | Little | June 11, 1940 |
| 2,679,751 | Pfeiffer | June 1, 1954 |
| 2,682,924 | Lomazzo et al. | July 6, 1954 |
| 2,698,537 | Taylor et al. | Jan. 4, 1955 |
| 2,752,788 | La Penta | July 3, 1956 |